US009106751B2

(12) United States Patent
O'Connell et al.

(10) Patent No.: US 9,106,751 B2
(45) Date of Patent: Aug. 11, 2015

(54) VOICEMAIL PAUSING

(75) Inventors: Brian M. O'Connell, Cary, NC (US);
Charles Steven Lingafelt, Durham, NC (US); Keith R. Walker, Austin, TX (US); John E. Moore, Brownsburg, IN (US); Martinianus BudiTjahja Hadinata, Brunnen (CH)

(73) Assignee: International Business Machines Corporation, Armonk, NY (US)

( * ) Notice: Subject to any disclaimer, the term of this patent is extended or adjusted under 35 U.S.C. 154(b) by 2172 days.

(21) Appl. No.: 12/034,495

(22) Filed: Feb. 20, 2008

(65) Prior Publication Data

US 2009/0207982 A1    Aug. 20, 2009

(51) Int. Cl.
*H04M 3/537*    (2006.01)
*H04M 3/533*    (2006.01)
H04W 4/12    (2009.01)
H04M 3/42    (2006.01)
H04M 1/725    (2006.01)

(52) U.S. Cl.
CPC ........ *H04M 3/53366* (2013.01); *H04M 1/7255* (2013.01); *H04M 3/42042* (2013.01); *H04M 3/537* (2013.01); *H04M 3/53383* (2013.01); *H04W 4/12* (2013.01)

(58) Field of Classification Search
CPC ... H04W 4/12; H04M 3/42042; H04M 3/537; H04M 1/7255; H04M 3/53366
USPC .......... 455/41.2, 412.1, 412.2, 413, 415, 416, 455/456.3, 466, 414.1
See application file for complete search history.

(56) References Cited

U.S. PATENT DOCUMENTS

| | | | |
|---|---|---|---|
| 5,642,428 A * | 6/1997 | Nowack | 381/107 |
| 5,943,402 A * | 8/1999 | Hamel et al. | 379/88.26 |
| 6,594,534 B1 * | 7/2003 | Crowell | 700/94 |
| 6,792,082 B1 * | 9/2004 | Levine | 379/67.1 |
| 7,254,227 B2 * | 8/2007 | Mumick et al. | 379/215.01 |
| 7,324,812 B2 * | 1/2008 | Wegman | 455/416 |
| 8,032,121 B2 * | 10/2011 | Kwon et al. | 455/413 |
| 8,150,003 B1 * | 4/2012 | Coughlan et al. | 379/88.22 |
| 8,249,226 B2 * | 8/2012 | Lingafelt et al. | 379/88.22 |
| 8,908,840 B2 * | 12/2014 | Phelps et al. | 379/88.25 |
| 2004/0214553 A1 * | 10/2004 | Kang et al. | 455/413 |
| 2004/0264653 A1 * | 12/2004 | Revisky et al. | 379/88.12 |
| 2004/0266399 A1 * | 12/2004 | Simpson | 455/412.1 |
| 2005/0053216 A1 * | 3/2005 | Spencer et al. | 379/211.01 |
| 2005/0085271 A1 * | 4/2005 | Yoshino | 455/563 |

(Continued)

OTHER PUBLICATIONS

Patent application for U.S. Appl. No. 14/718,160, filed May 21, 2015, Conf. No. 1023.

*Primary Examiner* — Lisa Hashem
(74) *Attorney, Agent, or Firm* — Schmeiser, Olsen & Watts, LLP; Mark C. Vallone

(57) ABSTRACT

A method and system for automatically pausing a remote voicemail recording to answer an incoming call and to notify an incoming caller of a user voicemail interaction. A command to pause the voicemail recording can be determined by the user prior to establishing the voicemail recording. Upon receiving an incoming call the user can be notified of the incoming call prior to terminating the voicemail recording. The command for pausing voicemail recording can be sent to a voicemail system to pause the voicemail recording if the user opts to receive the incoming call. When the call is concluded, the user can be returned to the voicemail system with options such as resume recording, playback, delete, or cancel the message.

18 Claims, 7 Drawing Sheets

(56) References Cited

U.S. PATENT DOCUMENTS

| | | |
|---|---|---|
| 2005/0277406 A1* | 12/2005 | Diroo et al. ................. 455/412.2 |
| 2008/0069313 A1* | 3/2008 | Simpson et al. ........... 379/88.12 |
| 2009/0238386 A1* | 9/2009 | Usher et al. ................... 381/315 |
| 2010/0091956 A1* | 4/2010 | Gopal ........................ 379/88.12 |
| 2010/0098227 A1* | 4/2010 | Hirschberg et al. ........ 379/88.22 |
| 2010/0260073 A1* | 10/2010 | Jager et al. .................... 370/259 |

\* cited by examiner

VOICEMAIL PAUSING

TECHNICAL FIELD

Embodiments are generally related to telecommunications products and techniques. Embodiments additionally relate in general to the field of computers and similar technologies, and in particular to software utilized in this field. Embodiments are also related to voice mail applications and techniques for handling incoming calls while recording voicemail.

BACKGROUND OF THE INVENTION

Voicemail is a feature that is common to many modern telephony systems, including both landline and wireless systems. When a call is placed to a subscriber on a telephony system that includes a voicemail system and if the call is not answered, the call can be redirected to an automated system that instructs and enables the caller to record a voicemail message. The voicemail message is then typically retrieved by the intended recipient at a later time. In modern telecommunications systems, network-based voicemail systems provide the subscribers with the ability to receive and review saved voice messages left by calling parties when the subscriber's telephone is busy or unanswered.

In instances when a caller records a voicemail and receives an incoming call, the caller may presently continue to record the voicemail by ignoring the incoming call, or the caller can answer the call leaving a partially recorded voicemail message. If the caller continues to record the voicemail, the incoming call is ignored and may be transferred to a voicemail, which often results in the user needing to return a call to the incoming caller. If the caller answers the incoming call, the voicemail recording is typically abandoned, resulting in a partially completed recording. The result is generally that either the voicemail must be abandoned or the incoming call must be ignored.

In the majority of prior art voicemail systems, the caller is provided with an audible instruction prior to recording, which indicates that the caller may push a key such as a '*' key to pause recording, with other keys to resume recording, play back, or start over. Similarly, with call waiting, the caller leaving a voicemail in such a system may be alerted to an incoming call and can pause the recording if the caller is aware of the proper codes to use. The caller can switch to the call, and then switch back to resume recording. Such voicemail systems have the ability to return to record the voicemail after placing a call from within the voicemail system. Such applications, however, may not permit the user to receive a call or to allow the inbound call event to automatically signal a pause with respect to the external voicemail system, Also, such systems do not provide the ability to instruct the inbound caller about the voicemail event or the ability to suspend the voicemail system.

Therefore, a need exists for an improved method and system for automatically pausing and resuming a voicemail message, while receiving an incoming call. A need also exists for notifying the incoming caller about the user voicemail interaction.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved voicemail method and system.

It is a further aspect of the present invention to provide for a method, system and computer-usable medium for automatically pausing a remote voicemail recording to answer an incoming call.

The aforementioned aspects and other objectives and advantages can now be achieved as described herein. A method and system is disclosed for automatically pausing a remote voicemail recording to answer an incoming call and to notify an incoming caller of a user voicemail interaction. A command to pause the voicemail recording can be determined by the user prior to establishing the voicemail recording. Upon receiving an incoming call the user can be notified of the incoming call prior to terminating the voicemail recording. The command to pause the voicemail recording can be sent to a voicemail system to pause the voicemail recording if the user opts to receive the incoming call. When the call is concluded, the user can be returned to the voicemail system with options such as resume recording, playback, delete, or cancel the message.

The incoming caller can be notified about the user voicemail interaction utilizing a message recorded by the user or a message recorded by a service provider or a computer synthesized message. Embodiments may automatically invoke this feature or permit the user to invoke this feature upon notification of the incoming call. Furthermore, the user can select a set of users to automatically notify such as those stored in the telephony device's address book. The telephony device can transmit a digital signal or keytones to a voicemail service provider requesting the voicemail to pause. The voicemail service provider can store the keytones required for pausing, resuming, and other manipulations of a remote service provider's voicemail system. The partial message already recorded can also be replayed to remind the user of the message content, and the user can be permitted to delete the partial left message and re-record the entire voicemail. The resuming recording can automatically normalize the volume of the previously recorded section with the new recording to minimize disparity in voice and background noise when said message is resumed.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
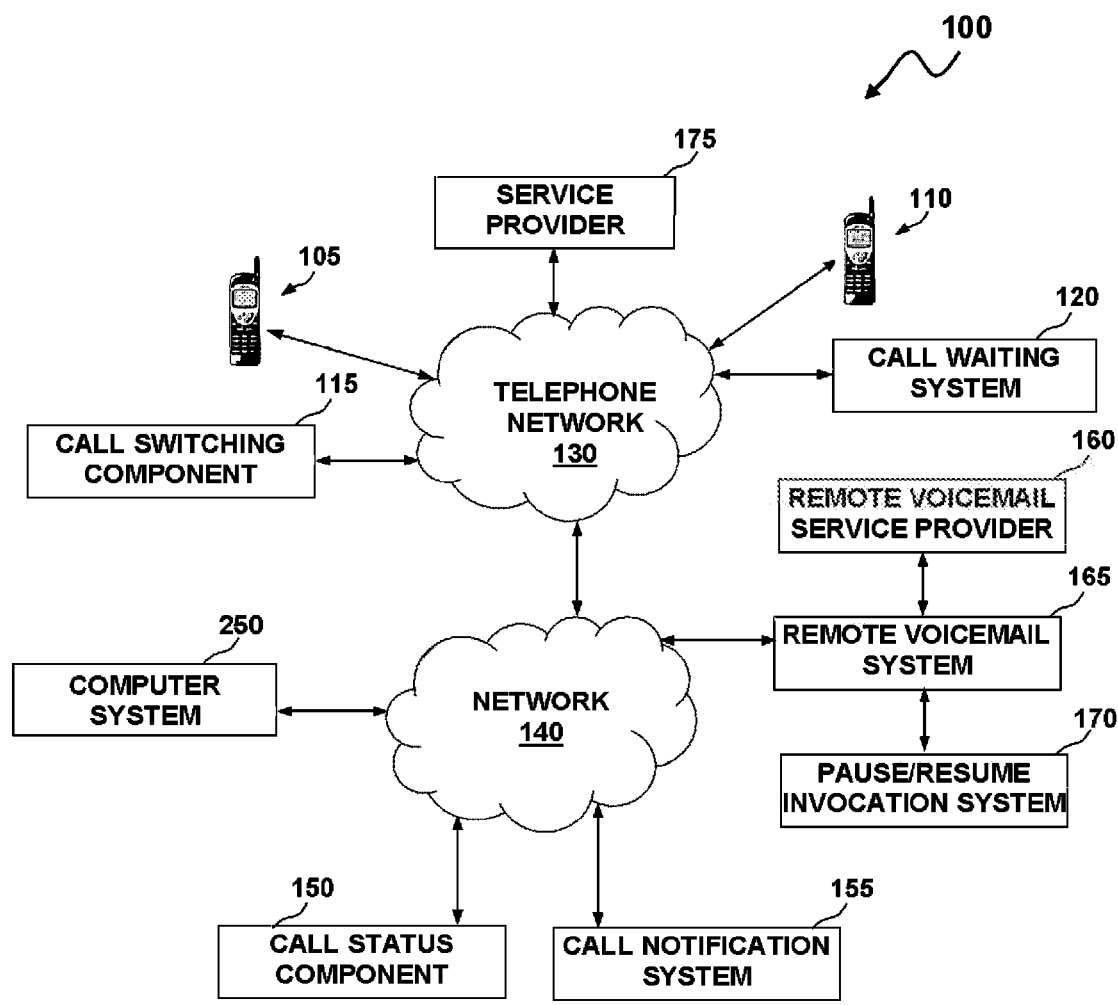
FIG. 1 illustrates a network diagram of a telephone system associated with a voicemail system, which can be implemented in accordance with invention preferred embodiment.

Referring to FIG. 1, a network diagram of a telephone system 100 associated with a voicemail system 165, is illustrated in accordance with the invention's preferred embodiment. The computer telephone system 100 includes a general-purpose computer system 250, one or more telephone devices 105 and 110 and a call-switching component 115, which is coupled to a telephone network 130. A remote voicemail system 165 can also be coupled to a network 140 for providing communication access from one or more telephone devices 105 and 110 to the voicemail system 165. A call waiting system 120 enables a user to be efficiently and effectively notified that a current call is waiting. The call waiting system 120 also provides audible notification for all incoming calls, whether the call is a current call or a waiting call, which is received while the current call is still in progress.

The voice mail system 165 operates to record voice messages for call waiting service subscribers. The voicemail system 165 utilizes conventional technology for storing messages of a calling party. These messages can include, for example, the calling party's number, and/or a voice message provided thereby. For instance, the voicemail system 165 can utilize a conventional IVR (Interactive Voice Response) system to guide the calling party in the voicemail process along with providing conventional storage media for recording said messages. The voicemail system 165 can utilize computing technology such as a desktop computer 200 in FIG. 2. The voicemail system 165 can operatively be coupled to a remote voicemail service provider 160 and a pause/resume invocation system 170.

The pause/resume invocation system 170 supports a remote pause, resume and repeat feature that may be invoked by the voicemail system 165, which is configured to store voicemail messages for the user. The pause/resume invocation system 170 can be invoked when the user is engaged with the remote voicemail system 165. For example, the voicemail system 165 may store voicemail messages for a caller and may store voicemail messages for a callee. However, the voicemail system 165 resides remotely from the callee and is typically serviced by the remote voicemail service provider 160, such as a telecommunications company. When a call is re-directed to the voicemail system 165, a callee's telephone device such as 105 is removed from the call flow and a connection between caller telephone device 110 and voicemail system 165 can be provided.

The telephone system 100 further includes a call status component 150 and a call notification system 155. A notification can be sent to the caller through the call notification system 155 if the caller receives a call while recording voicemail. If the caller opts to receive the incoming call, a command can be sent to the voicemail system 165 and the pause/resume invocation system 170 can pause the recording. The telephony device 105 can transmit a digital signal or keytones to the voicemail service provider 160 requesting the voicemail to pause. The service provider 175 can store keytones required for pausing, resuming, and other manipulations of remote voicemail system 165. The keytones can be transmitted to the telephony device 105 so that the telephony device 105 may transmit the keytones when required, or the service provider 175 transmits the keytones to the remote voicemail system 165 when instructed by the telephony device 105. If the remote voicemail service provider 160 is the same as the user's service provider 175, the user's service provider 175 can directly manipulate the voicemail system 165.

Figure 2:
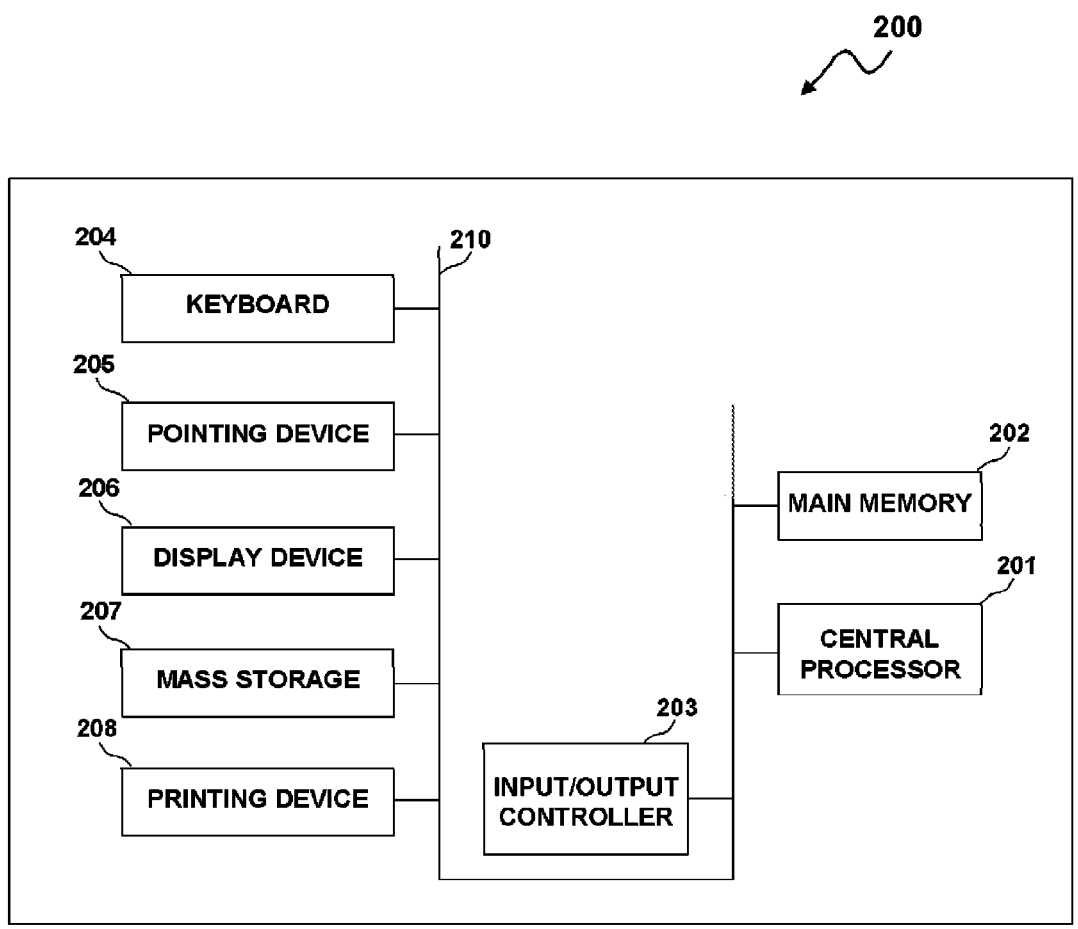
FIG. 2 illustrates a schematic view of a computer system in which the present invention may be embodied.
Figure 3:
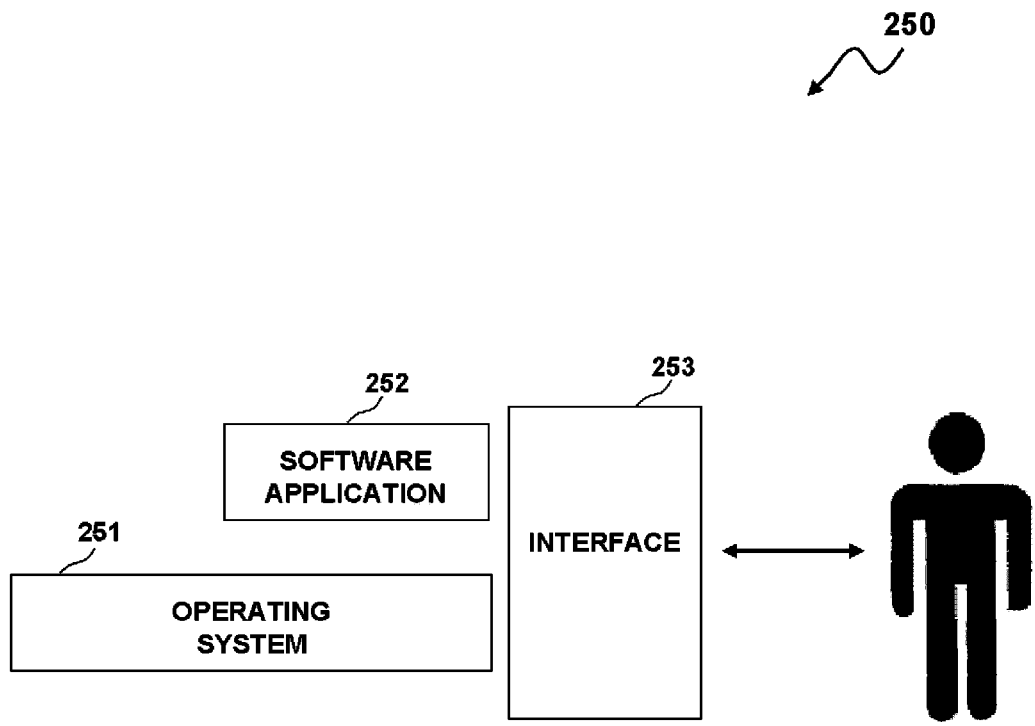
FIG. 3 illustrates a schematic view of a software system including an operating system, application software, and a user interface, which can be adapted for use in carrying out an embodiment of the present invention.
Figure 4:
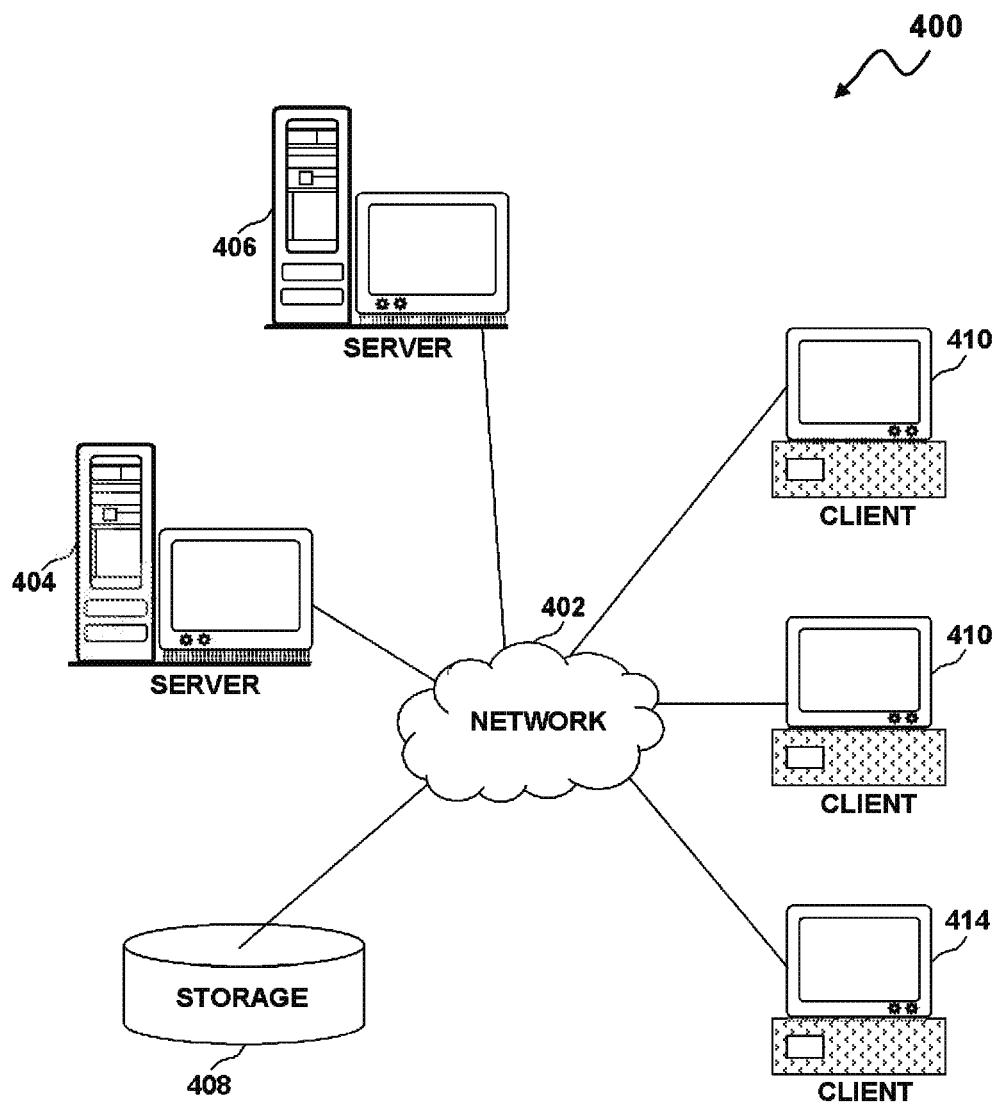
FIG. 4 depicts a graphical representation of a network of data-processing systems in which aspects of the present invention may be implemented.

FIGS. 2-4 are provided as exemplary diagrams of data-processing environments in which embodiments of the present invention may be implemented. It should be appreciated that FIGS. 2-4 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 2, the present invention may be embodied in the context of a data-processing apparatus 200 comprising a central processor 201, a main memory 202, an input/output controller 203, a keyboard 204, a pointing device 205 (e.g., mouse, track ball, pen device, or the like), a display device 206, and a mass storage 207 (e.g., hard disk). Additional input/output devices, such as a printing device 208, may be included in the data-processing apparatus 200 as desired. As illustrated, the various components of the data-processing apparatus 200 communicate through a system bus 210 or similar architecture.

Illustrated in FIG. 3, a computer software system 250 is provided for directing the operation of the data-processing apparatus 200. Software system 250, which is stored in main memory 202 and on mass storage 207, includes a kernel or operating system 251 and a shell or interface 253. One or more application programs, such as application software 252, may be "loaded" (i.e., transferred from storage 207 into memory 202) for execution by the data-processing apparatus 200. The data-processing apparatus 200 receives user commands and data through user interface 253; these inputs may then be acted upon by the data-processing apparatus 200 in accordance with instructions from operating module 251 and/or application module 252.

The interface 253, which is preferably a graphical user interface (GUI), also serves to display results, whereupon the user may supply additional inputs or terminate the session. In an embodiment, operating system 251 and interface 253 can be implemented in the context of a "Windows" system. Application module 252, on the other hand, can include instructions, such as the various operations described herein with respect to the various components and modules described herein, such as, for example, the methods 500, 600 depicted in FIGS. 5-6.

FIG. 4 depicts a graphical representation of a network of data-processing systems 400 in which aspects of the present invention may be implemented. Network data-processing system 400 is a network of computers in which embodiments of the present invention may be implemented. Network data-processing system 400 contains network 402, which is the medium used to provide communications links between various devices and computers connected together within network data-processing apparatus 200. Network 202 may include connections, such as wire, wireless communication links, or fiber optic cables.

In the depicted example, server 404 and server 406 connect to network 402 along with storage unit 408. In addition, clients 410, 412, and 414 connect to network 402. These clients 410, 412, and 414 may be, for example, personal computers or network computers. Data-processing apparatus 200 depicted in FIG. 2 can be, for example, a client such as client 410, 412, and/or 414. Alternatively, data-processing apparatus 200 can be implemented as a server, such as servers 404 and/or 406, depending upon design considerations.

In the depicted example, server 404 provides data, such as boot files, operating system images, and applications to clients 410, 412, and 414. Clients 410, 412, and 414 are clients to server 404 in this example. Network data-processing system 400 may include additional servers, clients, and other devices not shown. Specifically, clients may connect to any member of a network of servers which provide equivalent content.

In the depicted example, network data-processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data-processing system 400 also may be implemented as a number of different types of networks, such as for example, an intranet, a local area network (LAN), or a wide area network (WAN). FIG. 2 is intended as an example, and not as an architectural limitation for different embodiments of the present invention.

The following description is presented with respect to embodiments of the present invention, which can be embodied in the context of a data-processing system such as data-processing apparatus 200, computer software system 250 and data-processing system 400 and network 402 depicted respectively FIGS. 2-4. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 5:
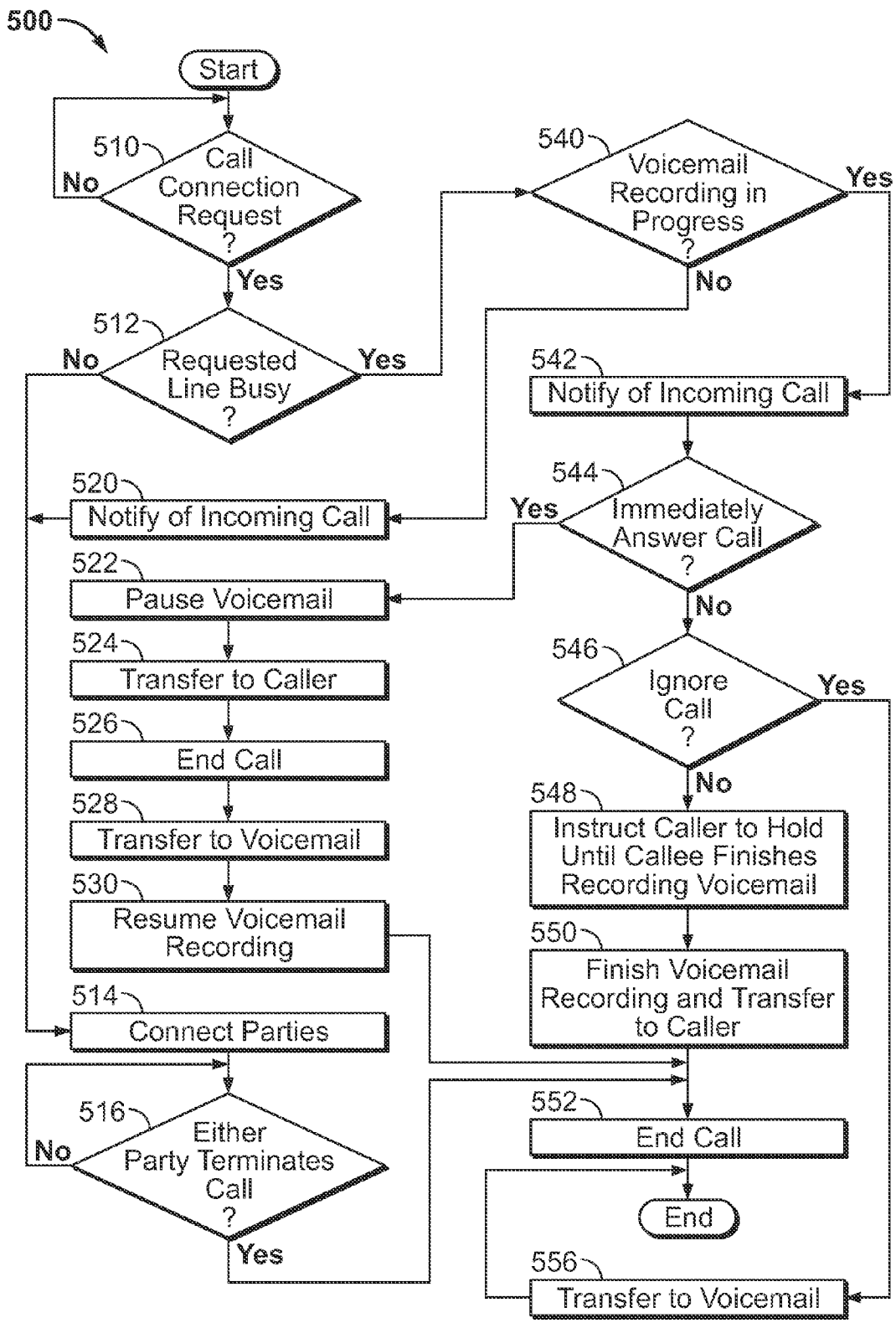
FIG. 5 illustrates a detailed flow chart of operations illustrating logical operational steps of a method for automatically pausing and resuming a remote voicemail recording, which can be implemented in accordance with a preferred embodiment.

FIG. 5 illustrates a detailed flow chart of operations illustrating logical operational steps of a method 500 for automatically pausing a remote voicemail recording to answer an incoming call, which can be implemented in accordance with a preferred embodiment. Note that the method 500 can be implemented in the context of a computer-useable medium that contains a program product. The method 500 depicted in FIG. 5 can also be implemented in a computer-usable medium containing a program product. A determination can be made if there is a call connection request, as depicted at block 510. If there is a call connection another determination can be made if the requested line is busy, as shown at block 512. If the requested line is not busy the parties can be connected, as illustrated at block 514. The call can be continued until either party terminates the call, as illustrated at block 516. If the call is terminated by either party, the call can be ended, as depicted at block 552.

If the requested line is busy, as shown at block 512, a determination can be made whether a voicemail recording process is in progress, as shown at block 540. If the voicemail recording process is not in progress, the incoming call can be notified to the callee, as depicted at block 520. Otherwise, the incoming call can be notified to the callee, as shown at block 542, and a determination can then be made whether to answer the call immediately, as illustrated at block 544. If the call has to be answered later a determination can be made whether to ignore the call, as depicted at block 546.

If the call is to be ignored the call can be transferred to the voicemail, as shown at block 556. Otherwise, the caller can be instructed to hold the line until the callee finishes recording the voicemail, as illustrated at block 548. The system 100 may inform the incoming caller utilizing a message recorded by the user, a message recorded by the provider, or a computer synthesized message. Embodiments may automatically invoke this feature or permit the user to invoke this feature upon notification of an incoming call. Furthermore, the user may select a set of users to automatically notify, such as those stored in the telephony devices address book.

After finishing voicemail recording the call can be transferred to the caller, as shown at block 550. Thereafter, the call can be ended, as depicted at block 552. If the incoming call has to be answered immediately the voicemail can be paused, as illustrated at block 522. The call can be transferred to the caller, as shown at block 524. After the call ends, as illustrated at block 526, the call can then be transferred to the voicemail, as illustrated at block 528. The voicemail recording can be resumed, as shown at block 530 and the call can be ended, as shown at block 552. It should be noted that the partial message already recorded can also be replayed prior to the step that resumes voicemail recording. Furthermore, the partial message can be replayed, reminding the user of the message content, and the user can be permitted to delete the partial left message and re-record the entire voicemail. An audio modification method can be utilized during post processing to normalize the audio levels of resumed messages to minimize the disparity in voice and background noise that may occur when a message is resumed.

The command to pause the voicemail recording can be determined by the user prior to establishing the voicemail recording and an incoming call can be notified to the user. This can be achieved by either a look-up to the voicemail system 165 matched to their commands, or by parsing the automated greeting for the word "pause" or similar word accompanied by a command such as "star", "pound" or "one." The command can then be sent to the voicemail system 165 to pause the recording, if the user opts to receive the incoming call. This can be a tone such as a standard call waiting tone generated by the call waiting system 120. The inbound caller's information, such as the name and phone number, can be displayed on a screen of the telephone device 105 and 110 or can be announced so as not to interrupt the user who prefers to continue their voicemail session. When the call is concluded, the user can be returned to the voicemail system 165 with options such as resume recording, playback, delete, or cancel the message.

Figure 6:
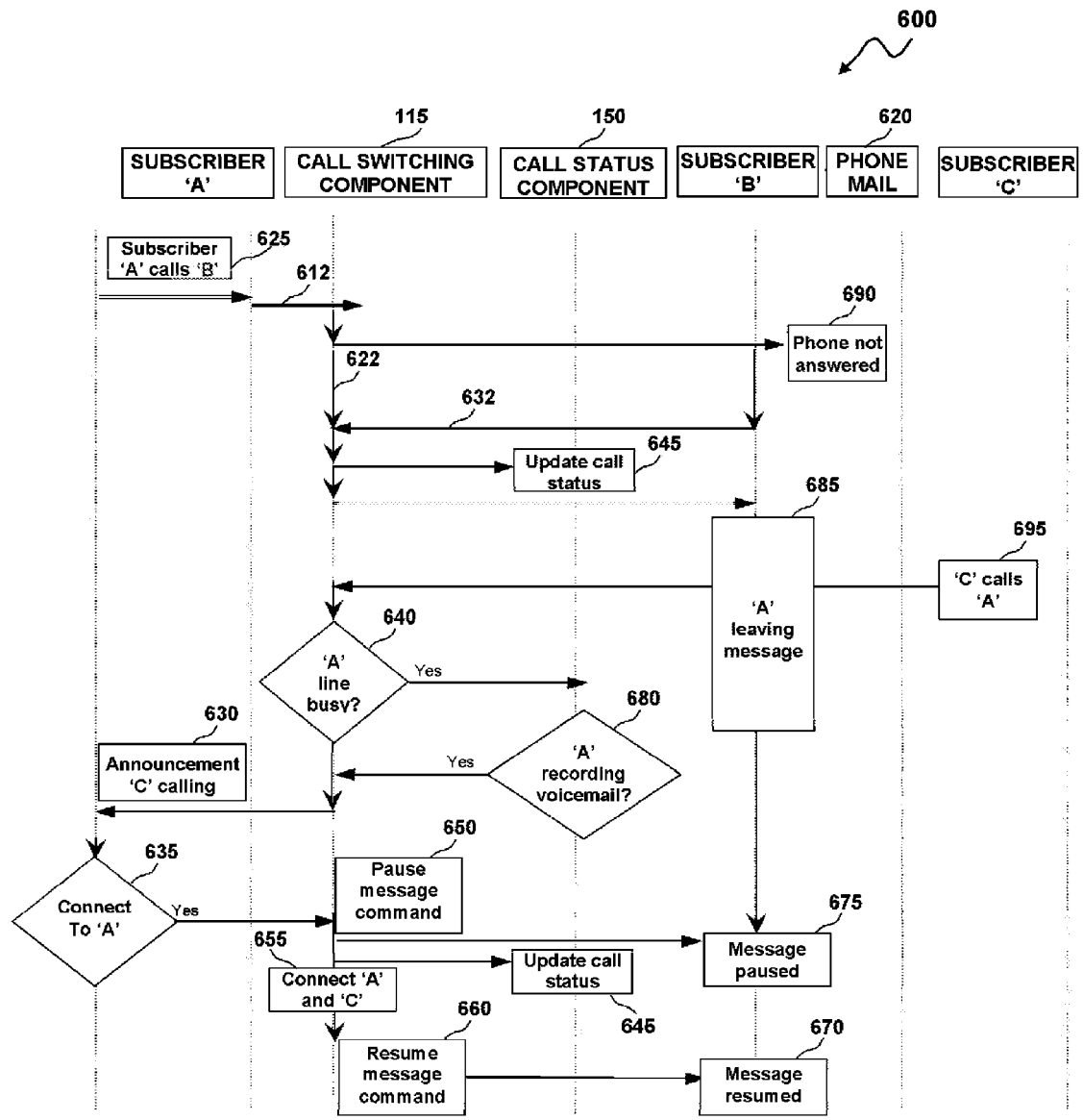
FIG. 6 illustrates a component activity diagram illustrating actions of components in a time sequence, which can be implemented in accordance with a preferred embodiment.

Referring to FIG. 6, a component activity diagram 600 illustrating actions of components in a time sequence is illustrated, in accordance with a preferred embodiment. The component activity diagram 600 depicted in FIG. 6 generally includes components such as call switching component 115, call status component 150 and phone mail functions 620. The component activity diagram 600 illustrates the actions of such components in a time sequence. The command flow is indicated in FIG. 6 by arrow 612 and the voice conversation flow is indicated by arrow 632.

As illustrated in the component activity diagram 600, a subscriber 'A' can call a subscriber 'B', as shown at block 625. If the subscriber 'B' does not answer, as indicated at block 620, then the call "rolls" to subscriber 'B' voicemail. The status of the call can be updated by the call status component 150, as depicted at block 645. As illustrated in FIG. 6 the arrow 622 represents component sequential activities. A status indicator can be set, indicating that subscriber 'A' is leaving a message for subscriber 'B', as depicted at block 685. A subscriber 'C' calls the subscriber 'A', as shown at block 695.

The call-switching component 115 can determine that subscriber 'C' is calling subscriber 'A' and subscriber 'A' is on the phone, as shown at block 640. The call-switching component 115 determines that subscriber 'A' is currently leaving a phone message for subscriber 'B'. The call-switching component 115 inquires from subscriber 'A' if subscriber 'A' wishes to immediately switch to subscriber 'C' incoming call, as depicted at block 635. If yes, then the present voicemail recording can be paused, as depicted at block 655. Otherwise, subscriber 'C' receives an automated voice prompt indicating that subscriber 'A' is recording a voicemail. The call status can be updated as shown at block 645 utilizing call status component 150. The pause/resume system 170 can be invoked while the user is engaged with the remote voicemail system 165 to pause and resume voicemail recording, as shown at block 650, 660 and 670.

The service provider 175 detects when the user is engaged with the voicemail system 165. If the caller's service provider 175 maintains the remote voicemail system 165, detection of user engagement with the voicemail system 165 may occur internally within the service provider 175. If another remote voicemail service provider 160 maintains the remote voicemail system 165, an agreement and a protocol for voicemail engagement notification may be required between service providers 160 and 175. The user can be presented with additional options to invoke the proposed invention to pause and resume the remote voicemail system 165 when the user engages the call waiting system 120. The options can be presented by the telephony device 105 and 110 utilizing known selection methods or the remote voicemail service provider 160 through voice prompts.

Figure 7:
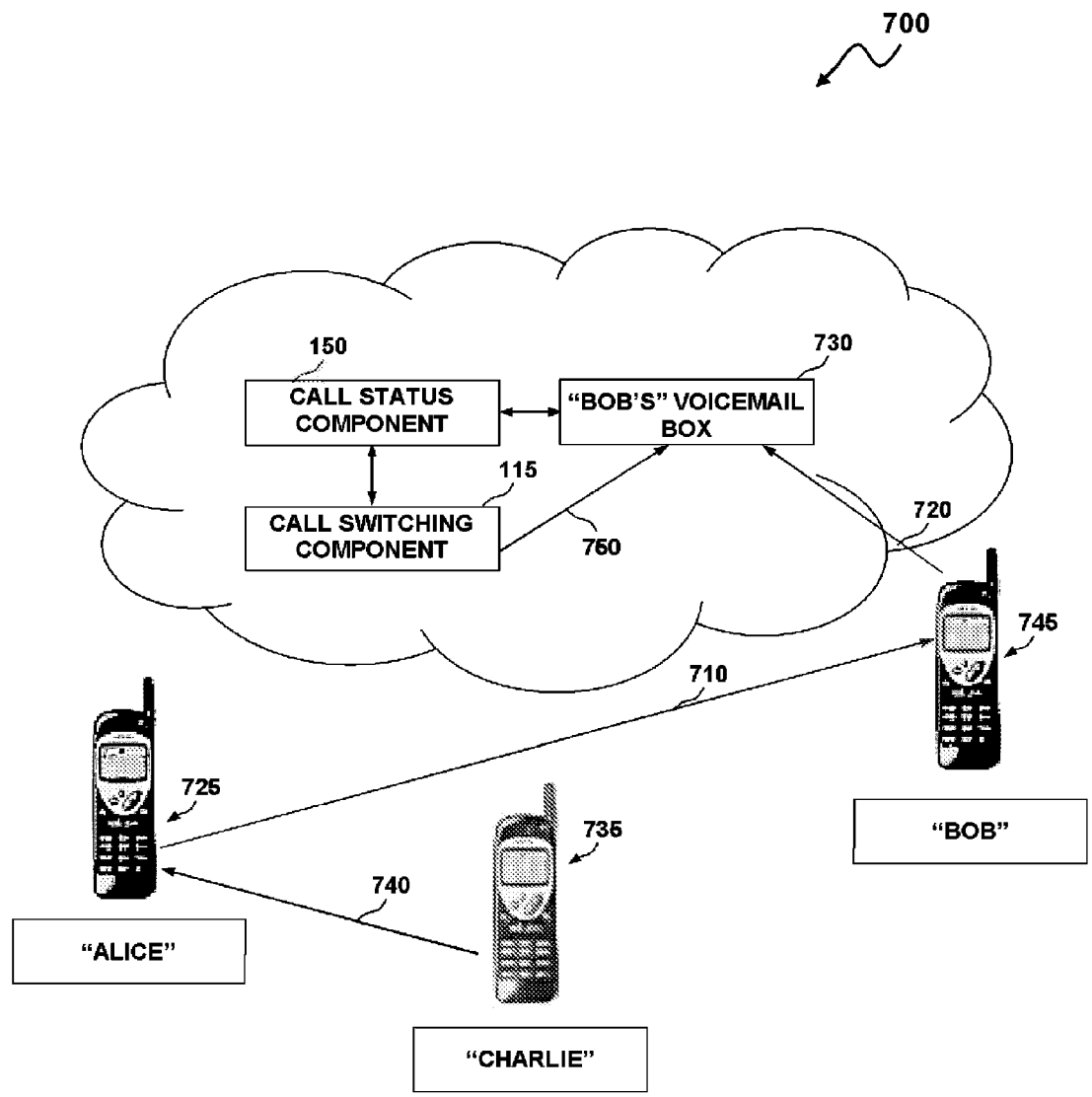
FIG. 7 illustrates an exemplary system diagram, which can be implemented in accordance with a preferred embodiment.

FIG. 7 illustrates an exemplary system diagram 700, which can be implemented in accordance with a preferred embodiment. It should be appreciated that the particular implementations shown and described herein are merely exemplary and are not intended to limit the scope of the present invention in any way. The exemplary system diagram 700 illustrates "Alice" leaving a voicemail for "Bob" and receives a call from "Charlie". The telephone device 725, 735 and 745 manages the phone mailbox for "Alice", "Bob" and "Charlie". "Alice" calls "Bob" as indicated by arrow 710. "Bob" does not answer and the call "rolls" to Bob's voicemail 730, as indicated by arrow 720. A status indicator is set, indicating that "Alice" is leaving a message for "Bob" by the call status component 150. "Charlie" calls "Alice", as indicated by arrow 740. The call-switching component 115 determines that "Charlie" is calling "Alice" AND "Alice" is on the phone. The call-switching component 115 further determines that "Alice" is currently leaving a phone message for "Bob". The call-switching component 115 inquires from "Alice" if "Alice" wishes to immediately switch to "Charlie's" incoming call. If yes, then the present voicemail recording can be paused, as indicated by arrow 750. Otherwise, "Charlie" receives an automated voice prompt indicating that "Alice" is recording a voicemail and will be with the caller shortly.

The user can associate proper keytones with each contact on the telephone device 105 and 110. In most embodiments the user can associate the keytones for voicemail manipulation such as pause, resume and delete for each user utilizing known methods of contact entry and manipulation. In an alternate embodiment, the user selects the service provider 175 for each contact and the telephony device 105 and 110 contains a table that associates the service provider 175 with keytones for remote voicemail manipulation. The proposed invention requires voicemail system 165 to support a remote pause, resume and repeat feature that may be invoked by the caller.

Programs defining functions on the present invention can be stored in a data storage system or a computer system in a variety of data storage media, which include, without limitation, non-writable storage media (e.g., CD-ROM), writable storage media (e.g., hard disk drive, read/write CD ROM, optical media), and system memory such as but not limited to Random Access Memory (RAM). It should be understood, therefore, that such data storage media when storing computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 2-4.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, said method comprising:

determining, by a processor of a computer system comprising a voicemail system, that a first telephone device communicatively connected to the voicemail system is receiving a call from a second telephone device while a process for recording a voicemail message being spoken by a user using the first telephone device is in progress in the voicemail system;

said processor inquiring with the user of the first telephone device whether to accept the call from the second telephone device before the process for recording the voicemail message is complete;

after said inquiring, said processor receiving from the first telephone device a command for the voicemail system to pause the process for recording the voicemail message, wherein the command comprises keytones required for pausing the voicemail system, said keytones having been transmitted prior to said recording the voicemail message to the first telephone device by the user's service provider; in response to said receiving the command for the voicemail system to pause the process for recording the voicemail message, said processor directing the voicemail system to pause the process for recording the voicemail message, which results in the recording of the voicemail message being paused by a remote pause/resume invocation system; after said pausing the process for recording the voicemail message, said processor connecting the call from the second telephone device to the first telephone device; in response to the call ending, said processor communicatively re-connecting the first telephone device to the voicemail system so that the user of the first telephone device can act upon the paused voicemail message; and after said communicatively re-connecting the first telephone device to the voicemail system, said processor resuming the process for recording the voicemail message.

2. The method of claim 1, said method further comprising:
   after said resuming the process for recording the voicemail message, said processor determining that the first telephone device is receiving a new call from a third telephone device while the process for recording the voicemail message is in progress; and
   after said determining that the first telephone device is receiving the new call, said processor sending a new message to the third telephone device, the new message indicating that the user is recording the voicemail message.

3. The method of claim 2, wherein the new message is a computer synthesized message.

4. The method of claim 2, said method further comprising:
   said processor sending the new message to each user of a plurality of users whose address is stored in an address book in the first telephone device.

5. The method of claim 2, further comprising:
   said processor instructing the third telephone device to hold until said recording the voicemail message has been completed.

6. The method of claim 1, said method further comprising
   after said resuming the process for recording the voicemail message, said processor completing said recording the voicemail message; and
   after said completing said recording the voicemail message, said processor normalizing an audio level of the recorded voicemail message, said normalizing consisting of normalizing the audio level of the resumed portion of the recorded voicemail message to minimize a disparity in voice and background noise in the resumed portion of the recorded voicemail message.

7. A computer system, comprising a processor, a memory, a computer readable hardware storage device, and a voicemail system, said storage device containing program code configured to be executed by the processor via the memory to implement a method, said method comprising: said processor determining that a first telephone device communicatively connected to the voicemail system is receiving a call from a second telephone device while a process for recording a voicemail message being spoken by a user using the first telephone device is in progress in the voicemail system; said processor inquiring with the user of the first telephone device whether to accept the call from the second telephone device before the process for recording the voicemail message is complete; after said inquiring, said processor receiving from the first telephone device a command for the voicemail system to pause the process for recording the voicemail message, wherein the command comprises keytones required for pausing the voicemail system, said keytones having been transmitted prior to said recording the voicemail message to the first telephone device by the user's service provider; in response to said receiving the command for the voicemail system to pause the process for recording the voicemail message, said processor directing the voicemail system to pause the process for recording the voicemail message, which results in the recording of the voicemail message being paused by a remote pause/resume invocation system;
   after said pausing the process for recording the voicemail message, said processor connecting the call from the second telephone device to the first telephone device; in response to the call ending, said processor communicatively re-connecting the first telephone device to the voicemail system so that the user of the first telephone device can act upon the paused voicemail message; and
   after said communicatively re-connecting the first telephone device to the voicemail system, said processor resuming the process for recording the voicemail message.

8. The computer system of claim 7, said method further comprising
   after said resuming the process for recording the voicemail message, said processor completing said recording the voicemail message; and
   after said completing said recording the voicemail message, said processor normalizing an audio level of the recorded voicemail message, said normalizing consisting of normalizing the audio level of the resumed portion of the recorded voicemail message to minimize a disparity in voice and background noise in the resumed portion of the recorded voicemail message.

9. The computer system of claim 7, said method further comprising:
   after said resuming the process for recording the voicemail message, said processor determining that the first telephone device is receiving a new call from a third telephone device while the process for recording the voicemail message is in progress; and
   after said determining that the first telephone device is receiving the new call, said processor sending a new message to the third telephone device, the new message indicating that the user is recording the voicemail message.

10. The computer system of claim 9, wherein the new message is a computer synthesized message.

11. The computer system of claim 9, said method further comprising:
   said processor sending the new message to each user of a plurality of users whose address is stored in an address book in the first telephone device.

12. The computer system of claim 9, further comprising:
   said processor instructing the third telephone device to hold until said recording the voicemail message has been completed.

13. A hardware storage device, comprising computer readable program code stored therein, said program code configured to be executed by a processor of a computer system to implement a method, said method comprising: said processor determining that a first telephone device communicatively connected to a voicemail system of the computer system is receiving a call from a second telephone device while a process for recording a voicemail message being spoken by a user using the first telephone device is in progress in the voicemail system; said processor inquiring with the user of the first telephone device whether to accept the call from the second telephone device before the process for recording the voicemail message is complete; after said inquiring, said processor receiving from the first telephone device a command for the voicemail system to pause the process for recording the voicemail message, wherein the command comprises keytones required for pausing the voicemail system, said keytones having been transmitted prior to said recording the voicemail message to the first telephone device by the user's service provider; in response to said receiving the command for the voicemail system to pause the process for recording the voicemail message, said processor directing the voicemail system to pause the process for recording the voicemail message, which results in the recording of the voicemail message being paused by a remote pause/resume invocation system; after said pausing the process for recording the voicemail message, said processor connecting the call from the second telephone device to the first telephone device; in response to the call ending, said processor communicatively re-connecting the first telephone device to the voicemail system so that the user of the first telephone device can act upon the paused voicemail message; and after said communicatively re-connecting the first telephone device to the voicemail system, said processor resuming the process for recording the voicemail message.

14. The storage device of claim 13, said method further comprising after said resuming the process for recording the voicemail message, said processor completing said recording the voicemail message; and after said completing said recording the voicemail message, said processor normalizing an audio level of the recorded voicemail message, said normalizing consisting of normalizing the audio level of the resumed portion of the recorded voicemail message to minimize a disparity in voice and background noise in the resumed portion of the recorded voicemail message.

15. The storage device of claim 13, said method further comprising:

after said resuming the process for recording the voicemail message, said processor determining that the first telephone device is receiving a new call from a third telephone device while the process for recording the voicemail message is in progress; and after said determining that the first telephone device is receiving the new call, said processor sending a new message to the third telephone device, the new message indicating that the user is recording the voicemail message.

16. The storage device of claim 15, wherein the new message is a computer synthesized message.

17. The storage device of claim 15, said method further comprising:

said processor sending the new message to each user of a plurality of users whose address is stored in an address book in the first telephone device.

18. The storage device of claim 15, further comprising:

said processor instructing the third telephone device to hold until said recording the voicemail message has been completed.

* * * * *